No. 670,800. Patented Mar. 26, 1901.
C. H. McBROOM.
ANIMAL POKE.
(Application filed June 19, 1900.)

(No Model.)

Witnesses
Harry S. Robert
F. McCleary

Inventor,
Charles H. McBroom.
By Victor J. Evans
Attorney

UNITED STATES PATENT OFFICE.

CHARLES H. McBROOM, OF CORTICELLI, MISSOURI.

ANIMAL-POKE.

SPECIFICATION forming part of Letters Patent No. 670,800, dated March 26, 1901.

Application filed June 19, 1900. Serial No. 20,887. (No model.)

*To all whom it may concern:*

Be it known that I, CHARLES H. MCBROOM, a citizen of the United States, residing at Corticelli, in the county of Moniteau and State of Missouri, have invented new and useful Improvements in Animal-Pokes, of which the following is a specification.

This invention relates to animal-pokes, and has for its object to provide a simple, durable, and efficient device of the character described which may be readily applied to and detached from an animal in a convenient manner.

With this object in view my invention consists in certain parts and combinations of parts, all of which will be described hereinafter, recited in the claims, and illustrated in the accompanying drawings, all forming a part of this specification.

Figure 1:
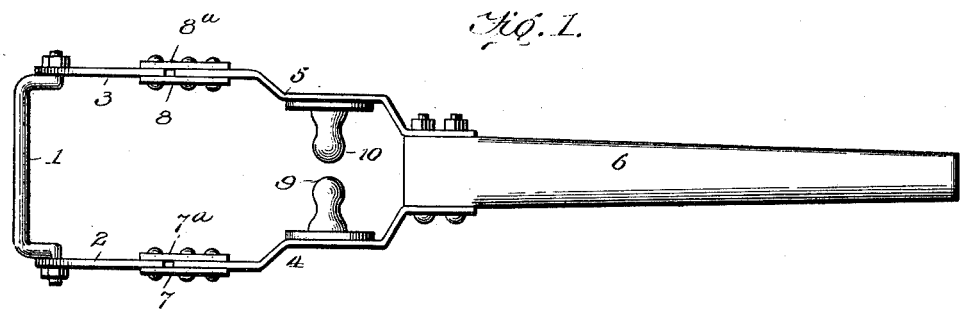
Figure 2:
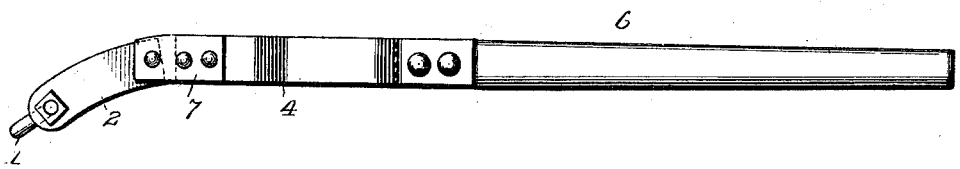
Figure 3:
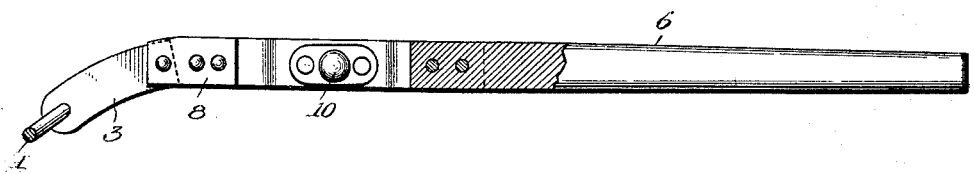

In the drawings, Figure 1 is a top plan view of the invention. Fig. 2 is a side elevation of the same, and Fig. 3 is a vertical longitudinal section therethrough.

Referring now to the drawings by reference-numerals, 1 designates a rock-shaft adapted to be secured under the jaw of the animal and on the crank-arms of which are secured two parallel flat bars 2 and 3.

4 and 5 designate two similar bars contracted or bent inwardly at one end and supporting a downwardly-projecting bar 6. These bars 4 and 5 are secured to those designated by the reference-numerals 2 and 3 by link-plates 7, 7ª, 8, and 8ª.

It will be noticed that the ends of the bars 4 and 5 which lie between the plates just described are cut at substantially right angles to the longitudinal edges thereof.

The ends of the plates 2 and 3 are similarly constructed and spaced a slight distance away from the ends of the bars 4 and 5, so that a pivotal motion may take place between the bars 2 and 3 and the remaining structure. However, this motion will be limited by the ends of the bars 2 and 3 striking against the ends of the bars 4 and 5, which can readily be seen by reference to Figs. 2 and 3. This will permit the animal to raise the bar 6 on a parallel plane with the earth when grazing; but as soon as its head is elevated the bar will drop down to its normal position and will act as a fender in case the animal should endeavor to break away a fence or other inclosure surrounding the field in which it is placed to pasture. The inwardly-disposed convex projections or bosses, (designated by the reference-numerals 9 and 10,) which are secured to the inner walls of the bars 4 and 5, are for the purpose of being inserted in the nostrils of the animal, and as the bars 2, 3, 4, and 5 are made of spring metal the bosses can be easily sprung apart to effect the desired result. The bar 1 being utilized to fit under the jaw of the animal will steady the device, so as to prevent the same from becoming accidentally displaced.

It will thus be seen that I have provided an improved animal-poke which may be attached to and detached from an animal in a most convenient manner, and while I have specifically referred to the several parts which make up its construction I would have it understood that I do not limit myself to the exact construction shown, but reserve the right to make all such changes as fairly fall within the scope of my invention.

I claim—

1. In an animal-poke; the combination with a depending bar, of side bars rigidly secured thereto, a second set of side bars hinged to those first mentioned, and composed of spring metal and inwardly-projecting extensions or bosses carried by the first-mentioned side bars for engagement with the nostrils of an animal; the meeting edges of the side bars being cut at right angles to their length so as to limit the downward movement of the depending bar.

2. In an animal-poke; the combination with a depending bar, of side bars rigidly secured thereto and projecting from one end thereof, means carried by the side bars for engagement with the nostrils of the animal, of pivoted bars secured to the first-named bars, the meeting edges of the respective bars being cut at right angles to their lengths so as to limit the movement of the depending bar, and means on the end of the last-named bars for engagement with the lower jaw of the animal to which the device may be applied.

3. In an animal-poke; the combination with a depending bar, of spring-actuated side bars rigidly secured thereto, bosses on the inner walls of said side bars, of a second set of side bars, pivotal connections between the two sets of bars, the meeting edges of the respective bars being cut at right angles so as to limit the downward movement of the depending bar, and a rock-shaft carried on the ends of the last-named bars for engagement with the jaw of the animal to which the device may be applied.

4. In an animal-poke; the combination with a depending bar, of two sets of side bars connected thereto, and pivotally connected together by means of plates, the meeting edges of the respective bars being cut at substantially right angles to their length so as to limit the outward movement of the depending bar, a rock-shaft carried by one set of bars for engagement with the lower jaw of the animal, and inwardly-projecting bosses carried by the other set of bars for engagement with the nostrils of the animal.

In testimony whereof I affix my signature in the presence of two witnesses.

CHAS. H. McBROOM.

Attest:
 W. J. FULKS,
 A. H. HILL.